Nov. 17, 1942.   W. O. DAVIES   2,302,300

CARRIER

Filed May 31, 1940

INVENTOR
WILLIAM O. DAVIES
BY
ATTORNEY

Patented Nov. 17, 1942

2,302,300

UNITED STATES PATENT OFFICE 2,302,300

CARRIER

William O. Davies, Great Kills, N. Y.

Application May 31, 1940, Serial No. 338,006

4 Claims. (Cl. 224—29)

This invention relates to improved carriers, and particularly to carriers adaptable for attachment to automobiles or other vehicles to transport articles of such length or nature as to be unsuitable for transportation within the body of the vehicle.

Carriers of various types, adapted to be hooked over sill of an automobile body, are known in the art. It is a characteristic of such prior art devices that a side wall or equivalent structure thereof bears directly against the side wall of the vehicle body; if, as is true of the conventional "streamlined" automobile body, the body wall is convex, the side structure of the carrier may be tangent to the body wall, and the carrier will be ineffectually supported. Additionally, it is necessary to pad the side structure of the carrier to prevent marring the vehicle body finish; the function of such padding is wholly negative, in that it contributes nothing to the securement of the carrier.

According to the present invention, however, the carrier means embodies, supplementally to hook means or the like for suspending the carrier from the sill of a vehicle body, a suction cup or the like, operative to secure the carrier to the body substantially beneath the sill. Additionally and importantly, the suction cup or equivalent provides a shock-absorbent mounting which steadies the carrier against the jouncing or vibration of the goods carried; forms a resilient cushion which disposes the side structure of the carrier at a suitable distance from the wall of the vehicle; and provides means for adjusting the spacing between the operating face of the suction cup and the side structure of the carrier to which it is secured or otherwise operatively associated.

Among the objects of my invention, therefore, are:

To provide an improved carrier which may be quickly and securely positioned for use without requiring permanent attachment;

To provide carrier means for use with an automibile or the like, wherein a main portion of the carrier is resiliently supported at a suitable distance from a wall of the vehicle, thereby clearing projections or surface irregularities of the body wall; and To provide a carrier embodying hook means for securement over a window ledge or the like, and suction cup means or equivalent arranged for surface engagement with a wall beneath such ledge to cooperate with the hook means in the secure attachment of the carrier.

Other features and advantages will hereinafter appear.

In the accompanying drawing:

Figure 2 is a perspective of a carrier pursuant to the present invention;

Figure 3 is a side elevation of the carrier of Fig. 2, a portion of the side wall and window ledge of an automobile being shown in section to illustrate a method of applying the invention;

Figure 4 is an elevation of a portion of the carrier frame, showing the adjustable strap-retention means;

Figure 5 is a section of such strap-retention means, taken on lines 5—5 of Figure 4; and Figure 6 illustrates a second form of suction cup means.

Figure 1:
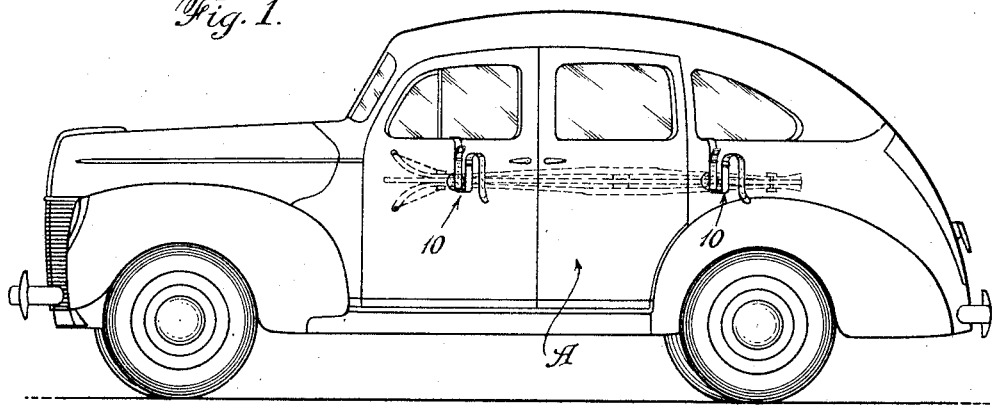
Figure 1 is a side elevation of an automobile, typical of any vehicle, on the side of which a pair of carriers embodying the present invention are mounted; the dotted outlines indicate a pair of skis supported in the carriers.
Figure 1:
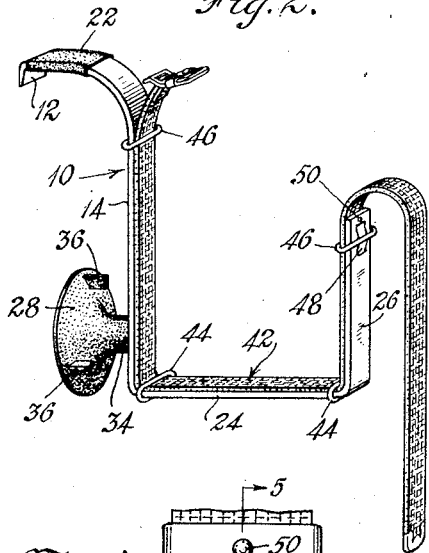
Figure 1:
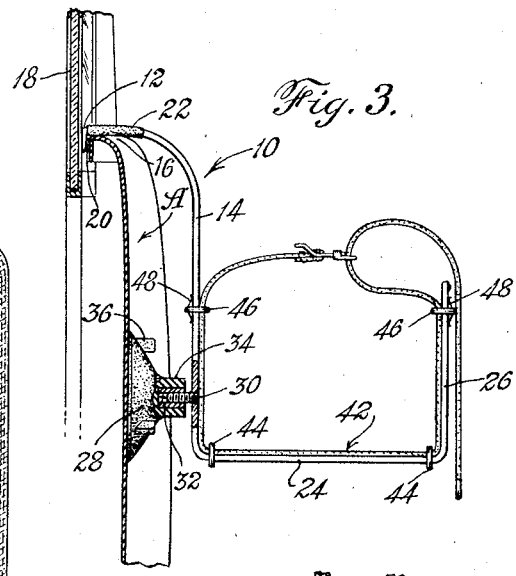
Figure 1:
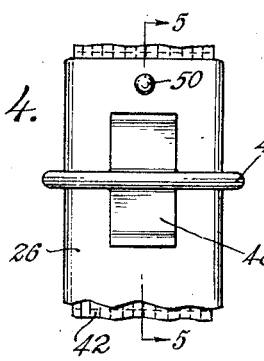
Figure 1:
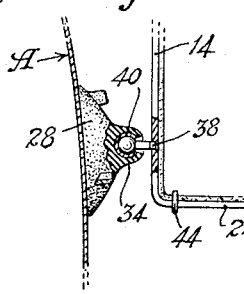

Referring to the drawing, my improved carrier, in a preferred form, includes a frame having a pocket or the like for receiving the objects to be carried, said pocket being provided with a strap or other convenient accessory for securing the objects, a hook by which the frame may be hung from a window ledge or other supporting structure, and a suction cup or equivalent by means of which the frame may be temporarily adhesively secured to a wall of the supporting structure.

Specifically, see Figs. 2 and 3, the carrier 10 may include a frame formed from strap iron, pressed metal, or other material having qualities of durability and ease of fabrication into the typical form shown. An end of the frame is bent on a long-radius curve, terminating in a downwardly directed wedge-like hook 12, such hook being preferably in parallelism with the vertical frame side member 14. Hook 12 is dimensioned to fit over a ledge, such as the window sill 16, whereby the carrier is hung from such ledge; because of its spatulate, wedge form, the hook readily accommodates itself between the glazing 18 and stop-water 20 of an automobile body.

In Figs. 2 and 3, the carrier frame may have a sleeve or coating 22 of rubber of any desired extent of coverage for protecting the finish of the sill.

The pocket, or carrier space, of my invention, may have any convenient formation; I prefer to make it integral with the frame by bending the same into a horizontal base 24 and an outer vertical post 26.

As illustrated in Figure 1, a pair of carriers 10 may be employed to carry relatively long objects, such as the skis illustrated, lengths of pipe or lumber, etc. Accordingly, one of the carriers is suspended from a front window, and the second, from a rear window. As is well known, the body, A, of a present day automobile may be convexly curved, reaching maximum width at a location intermediate such front and rear windows. The amount of offset of the hanger portion of the frame should therefore be adequate to allow for reasonable variations in the width of sill 14 and maximum outward curvature of the body and such projections as handles, hinges, etc. By suitably spacing the member 14 from the body wall, the carrier portion of the frame is placed wholly clear of obstructions, and such carrier portion may be used to its full capacity.

In cooperation with the hook 12, resiliently securing the carrier frame to the vehicle body, and serving additionally to maintain the member 14 in suitable spaced relation to the body, I prefer to employ suitable suction cup means 28. Interposed between the suction cup and the frame, and acting to secure the suction cup thereto, is a preferably resilient shank 34, which may be integral with the suction cup. In the embodiment of Fig. 3, a stud bolt 30, projecting from frame member 14, cooperates with a female-threaded sleeve 32 in the shank, thus affording adjustment of the spacing between the operating face of the suction cup and the frame member 14. While such adjustment is not essential, it renders the carrier more readily adaptable to sill structures of abnormal width.

In the embodiment of Figure 6, the suction cup 28 is swivelly secured to frame member 14, as by the ball-headed bolt 38 operatively associated with a socket 40 provided within the shank 34. By such swivel means, the securement of the suction cup to curved or angular surfaces is facilitated. It should be understood, however, that the inherent flexibility of the suction cup and the shank 34 associated therewith in the Figure 3 embodiment renders such organization satisfactory for use with all but surfaces having pronounced angular relation with respect to frame member 14.

To facilitate the release of the suction cup from the supporting wall surface, lugs 36 are provided, said lugs, when grasped and drawn outwardly, lifting a portion of the cup away from the body wall and permitting inflow of air to dissipate the vacuum condition.

A strap 42, or equivalent, provides simple means for the securement of articles to be carried. Preferably, such strap extends continuously in engagement with elements 14, 24, and 26 of the carrier frame, thus providing a cushion-like lining for the frame. As shown in Figure 2, the strap may be secured at the corners of base member 24, by the wire loops 44, 44, and to the side members 14 and 26 by adjustable clamp means comprising a loop 46 loosely encircling strap 42 and its adjacent carrier frame member, in operative association with spring clip means 48. Such spring clip means urge the loop 46 outwardly to bind the strap against the adjacent frame member. Loops 46 may be positioned according to the bulk of the articles being carried. When the strap is loosened to remove the articles, see Figure 3, the strap is neatly supported in readiness for future use.

At member 26, a rivet 50, bead, or the like, may be positioned to prevent the accidental removal of the loop 46 and clip 48.

In applying the carrier 10 to an automobile body, for example, the carrier frame is suspended from the sill by the hook 12, and then moved against the body A to bring the suction cup into engagement with the body wall and to establish a vacuum condition within the cup, thereby securing the carrier firmly to the body wall structure. It will be noted that the position of the suction cup 28 remote from the hook 12 and adjacent the pocket means of the carrier, takes full advantage of the rotative effect which the weight of the articles carried, exerts; such tendency towards rotation being in the direction of the body, the cup 28 is held securely thereagainst.

Suction cup 28 provides a shock absorbent base for the carrier structure. The inherent resilience of the cup 28 and the shank 34 associated therewith absorbs the jouncing and vibration of the carrier during normal use.

Having now described and illustrated my invention in one preferred form thereof, I wish it to be understood that my invention is not to be limited to the specific form or arrangement of parts herein described and shown, or specifically covered by the claims.

I claim as my invention:

1. A carrier, comprising a frame member having at one end an outwardly and downwardly extending wedge-like hook for insertion between an automobile body sidewall and a window thereof and having at an opposite end an outward and upward extension to form a load-receiving space, resilient suction cup means secured to said frame member adjacent said extension to secure said frame member to such automobile body sidewall in substantially parallel spaced relationship therewith, strap means associated with said frame for securing an object to be carried, loop means encircling said strap means and said frame, and means adjustable along said frame and interposed between said loop means and said frame for frictionally securing said loop means in desired position along said frame.

2. A carrier, comprising a frame member provided at one end with an outwardly and downwardly extending hook member for freely suspending said carrier from a ledge of an automobile body sidewall, an opposite end of said frame member having a load-receiving space including a base portion extending outwardly from said frame member at substantially right angles thereto, suction cup means for releasably attaching said frame member to said sidewall and thereby restraining outward rotation of said carrier about its hook member as a pivot, and means for securing said suction cup means to said frame member in spaced relationship therewith, said suction cup securement means including a resilient element disposed between said suction cup means and said frame member.

3. A carrier, comprising a frame member provided at one end with an outwardly and downwardly extending hook member for suspending said carrier from a ledge of an automobile body sidewall, an opposite end of said frame member having a load-receiving space including a base portion extending outwardly from said frame member at substantially right angles thereto, suction cup means for releasably attaching said frame member to said sidewall and thereby restraining rotation of said carrier about its hook member as a pivot, and means for securing said suction cup means to said frame member in spaced relationship therewith.

4. A carrier, comprising a frame member provided at one end with an outwardly and downwardly extending hook member for suspending said carrier from a ledge of a vehicle body sidewall, an opposite end of said frame member having a load-receiving space including a base portion extending outwardly from said frame member at substantially right angles thereto, suction cup means for releasably securing said frame to said sidewall, and means for attaching said suction cup means to said frame member.

WILLIAM O. DAVIES.